(No Model.)
C. BRÜHL.
CATTLE TONGS.
No. 251,825. Patented Jan. 3, 1882.
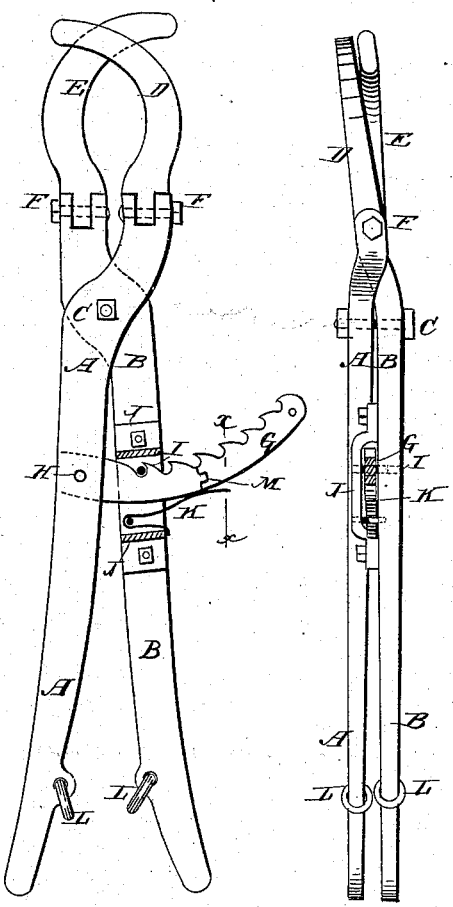
WITNESSES:
Francis McArdle
C. Sedgwick
INVENTOR:
C. Brühl
BY Munn & Co
ATTORNEYS.

UNITED STATES PATENT OFFICE.

CHRISTOPHER BRÜHL, OF GREEN POINT, NEW YORK.

CATTLE-TONGS.

SPECIFICATION forming part of Letters Patent No. 251,825, dated January 3, 1882.

Application filed October 3, 1881. (No model.)

*To all whom it may concern:*

Be it known that I, CHRISTOPHER BRÜHL, of Green Point, in the county of Kings and State of New York, have invented certain new and useful Improvements in Cattle-Tongs, of which the following is a specification.

Reference is to be had to the accompanying drawings, forming part of this specification, in which similar letters of reference indicate corresponding parts in all the figures.

Figure 1 is a plan view of my improvement, partly in section. Fig. 2 is an edge view of the same, partly in section, through the line $x$ $x$, Fig. 1.

The object of this invention is to facilitate the catching and holding of wild cattle in slaughter-houses and other places.

The invention consists in cattle-tongs having its jaws hinged to the handles; also, in combination with the handles having hinged jaws, of a hinged serrated locking-arm, a locking-pin, a spring, and keeper; also, in a serrated locking-arm made with a hinged joint, all as hereinafter fully described.

A B are two handles, which are hinged to each other by a bolt, C. Upon the forward ends of the handles A B are formed jaws D E, which are curved inward, as shown in Fig. 1, so that their forward ends will overlap each other when the handles A B are brought together. I prefer to make the jaws D E with hinge-joints F, as shown in Figs. 1 and 2, to prevent the legs of the cattle from being broken when thrown by drawing upon the tongs.

To one of the handles, as A, is hinged an arm, G, by a bolt or rivet, H. The arm G is curved in the arc of a circle, and has ratchet-teeth upon its inner or concave edge to engage with a pin, I, attached to the other handle, B, and lock the jaws D E in place when the tongs are closed. The serrated arm G is kept in place against the handle B by a keeper, J, attached to the said handle B. The catch-arm G is held forward against the pin I by a spring, K, attached to the handle B in such a position as to rest against the outer or convex edge of the arm G, as shown in Fig. 1. The serrated arm G can be made with a hinge-joint, M, in its middle part, as shown in Fig. 1, so that the outer or free end of the said arm G can swing down out of the way when the animal is being thrown and hoisted. To the outer ends of the handles A B are secured rings L, or in them are formed eyes to receive the hoisting-rope for slinging and hoisting the cattle.

In using the tongs the jaws D E are closed around the hind leg of an animal, where they will be held in place by the locking-arm G and pin I. The hoisting-rope is then drawn upon to sling or throw the animal to be butchered, and afterward to suspend the said animal to bleed.

By the use of this improvement the danger attending the butchering of cattle in the ordinary manner is avoided and the labor is greatly lessened.

Having thus fully described my invention, I claim as new and desire to secure by Letters Patent—

1. In cattle-tongs, the combination, with the pivoted handles A B, of the jaws D E, hinged to the said handles, substantially as and for the purpose set forth.

2. In cattle-tongs, the combination, with the pivoted handles A B, provided with the hinged jaws D E, of the hinged serrated arm G, the locking-pin I, the spring K, and the keeper J, substantially as and for the purpose set forth.

3. In cattle-tongs, the serrated locking-arm G, made with a hinge-joint, substantially as herein shown and described, whereby the free end of the said arm can swing down out of the way, as set forth.

C. BRÜHL.

Witnesses:
JAMES T. GRAHAM,
C. SEDGWICK.